United States Patent [19]

Buckley et al.

[11] Patent Number: 4,752,363

[45] Date of Patent: Jun. 21, 1988

[54] EFFLUENT TREATMENT

[75] Inventors: Christopher A. Buckley; Alison E. Simpson, both of Durban, South Africa

[73] Assignee: The Water Research Commission, South Africa

[21] Appl. No.: 64,339

[22] Filed: Jun. 19, 1987

[30] Foreign Application Priority Data

Jun. 24, 1986 [ZA] South Africa ................. 86/4706

[51] Int. Cl.⁴ ............................................. C25B 1/14
[52] U.S. Cl. ....................................... 204/98; 204/101; 204/128; 204/132; 204/131; 204/132
[58] Field of Search .......... 204/98, 128, 101, 130–131, 204/132, 152

[56] References Cited

U.S. PATENT DOCUMENTS 775,829 11/1904 Kitsee .................................. 204/132
2,828,253 3/1958 Kurz .................................... 204/132

Primary Examiner—R. L. Andrews

[57] ABSTRACT

A method of treating an organic material such as textile fibres with an alkali metal hydroxide solution including the steps of:

(i) contacting the organic material with the hydroxide solution to produce an effluent comprising an alkali metal hydroxide solution which contains multivalent ions and soluble and insoluble organic and inorganic matter;

(ii) reducing the pH of the effluent to a value in the range 7 to 9 by contacting it with an acid gas;

(iii) filtering the solution from step (ii) to remove suspended insoluble matter having a size greater than 0,1 microns.

(iv) filtering the filtrate from step (iii) to remove multivalent ions and organic matter having a molecular mass greater than about 300 daltons;

(v) providing an electrochemical cell in which an anode compartment is separated from a cathode compartment by a cation selective membrane;

(vi) passing the filtrate from step (iv) into the anode compartment, of the electrochemical cell;

(vii) passing an electrical current through the cell causing alkali metal ions to pass through the cation selective membrane and alkali metal hydroxide to be produced in the cathode compartment and the acid gas to be produced in the anode compartment (viii) returning the alkali metal hydroxide to step (i); and (ix) using the acid gas produced in the anode compartment for reducing the pH of the effluent in step (ii).

21 Claims, 1 Drawing Sheet

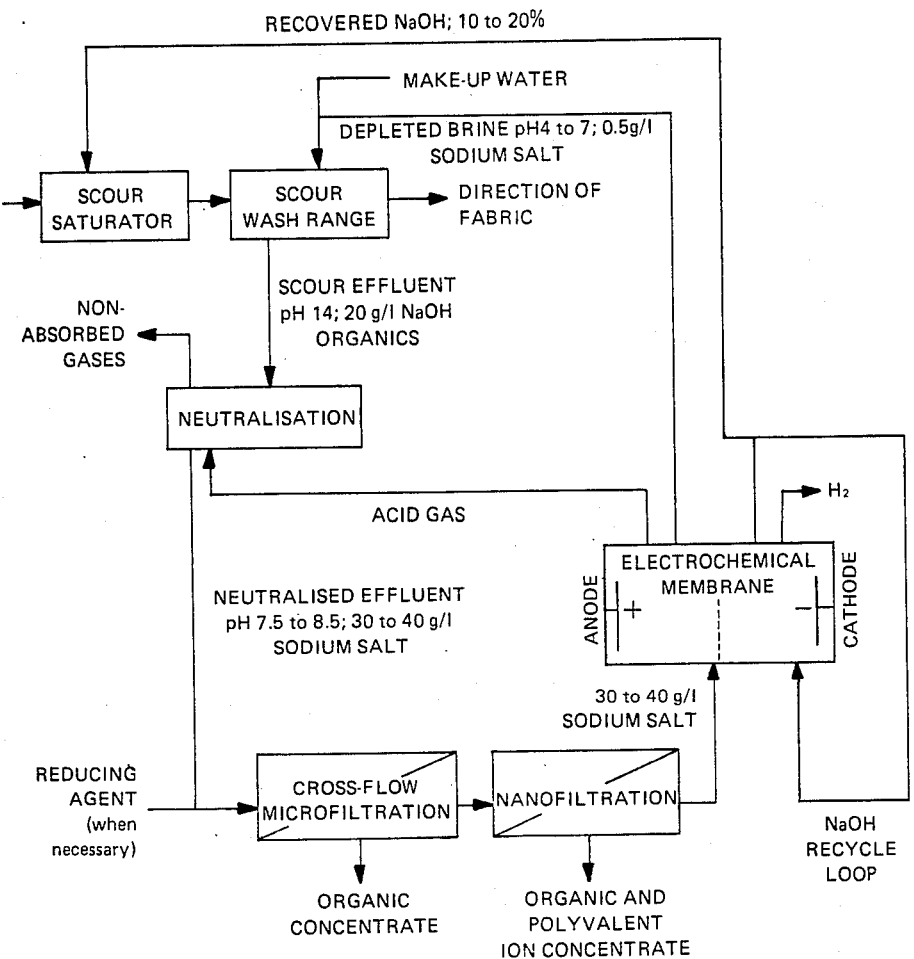

EFFLUENT TREATMENT

BACKGROUND OF THE INVENTION

This invention relates to effluent treatment.

Sodium hydroxide is used in many industries for cleaning and extracting impurities for intermediate and final products. Examples include:

(i) caustic scouring of cotton fibre and fabric;
(ii) bottle washing;
(iii) peeling of fruit and vegetables;
(iv) treating the fibres for the paper industry.

Specialised surfactants may be used to prevent the precipitation and redeposition of calcium and magnesium salts in the effluents from these processes. The amount of sodium hydroxide which is chemically consumed in the washing/extraction process is usually small. the caustic is then washed from the cleaned article and dilute caustic effluent containing organic and inorganic impurities is produced. The treatment of this effluent is problematic in that it has a high pH value and is usually high in organic content.

Typical methods of treatment include:
neutralisation
biological oxidation
ion exchange
evaporation
direct discharge to the environment.

Except for evaporation, the other methods of treatment do not recover the caustic and result in an alkaline or saline effluent. In South Africa and elsewhere saline effluents are particularly problematic in that the increasing salinity of fresh water environments is a major cause of decreasing water quality which thus reduces its potential for reuse.

SUMMARY OF THE INVENTION

According to one aspect of the present invention, there is provided a method of treating an alkali metal salt or hydroxide solution which contains multivalent ions, and insoluble and soluble organic and inorganic matter including the steps of:

(i) if the solution has a pH greater than 9, bringing the pH of the solution to a pH in the range 7 to 9,
(ii) filtering the solution from step (i) to remove suspended insoluble matter having a size greater than 0.1 microns;
(iii) filtering the filtrate from step (ii) to remove multivalent ions and organic matter having a molecular mass greater than about 300 daltons;
(iv) providing an electrochemical cell in which an anode compartment is separated from a cathode compartment by a cation selective membrane;
(v) passing the filtrate from step (iii) into the anode compartment of the electrochemical cell; and
(vi) passing an electrical direct current through the cell to cause alkali metal ions to pass through the cation selective membrane and alkali metal hydroxide to be produced in the cathode compartment and an acidic component to be produced in the anode compartment.

According to another aspect of the invention, there is provided a method of treating an organic material with an alkali metal hydroxide solution including the steps of:

(i) contacting the organic material with the hydroxide solution to produce an effluent comprising an alkali metal hydroxide solution which contains multivalent ions and soluble and insoluble organic and inorganic matter;
(ii) reducing the pH of the effluent to a value in the range 7 to 9 by contacting it with an acid gas;
(iii) filtering the solution from step (ii) to remove suspended insoluble matter having a size greater than 0,1 microns.
(iv) filtering the filtrate from step (iii) to remove multivalent ions and organic matter having a molecular mass greater than about 300 daltons;
(v) providing an electrochemical cell in which an anode compartment is separated from a cathode compartment by a cation selective membrane;
(vi) passing the filtrate from step (iv) into the anode compartment of the electrochemical cell;
(vii) passing an electrical current through the cell causing alkali metal ions to pass through the cation selective membrane and alkali metal hydroxide to be produced in the cathode compartment and the acid gas to be produced in the anode compartment;
(viii) returning the alkali metal hydroxide to step (i);
(ix) using the acid gas produced in the anode compartment for reducing the pH of the effluent in step (ii).
(x) returning the depleted solution from the anode compartment, if required, to step (i).

DESCRIPTION OF THE DRAWING

The drawing is a flow diagram of an embodiment of the invention.

DETAILED DESCRIPTION OF THE INVENTION

The present invention has major application in the cleaning of effluents from alkali metal hydroxide, particularly sodium hydroxide, treatment processes. Examples of these processes are the scouring of organic fibres used in the textile industry and the treatment of organic fibres used in making pulp and paper products. The invention also has application in treating effluents from the washing of bottles or other articles with alkali metal hydroxide. Such effluents will contain alkali metal hydroxides and contaminants such as multivalent ions such as calcium and magnesium ions, and unwanted soluble and insoluble organic and inorganic matter. in the scouring of fibres for use in textiles the organic matter will include pectins, waxes, sugars and starches. In the treatment of fibres for use in making paper or paper products the organic matter will include sugars, starches and lignins.

The method of the invention involves four fundamental steps, namely reduction of pH of the solution, if necessary, two filtration steps and an electrochemical step. Each of these steps will be described in greater detail hereinafter.

REDUCTION OF pH

The invention has major application to the treatment of alkali metal hydroxide solutions which will have a pH of the order of 12 to 14. It is necessary to reduce the pH of such solutions to a pH in the range 7 to 9 to cause some of the organic material in the effluent to flocculate, to ensure efficient filtration in the subsequent steps and life of the nanofiltration membrane, when used.

The pH may conveniently be reduced by contacting the solution with an acid gas, for example in an absorption column. The acid gas may be chlorine or carbon dioxide but is preferably carbon dioxide. If the acid gas is chlorine the pH is preferably reduced to a value in the range 7 to 9 whereas if the acid gas is carbon dioxide the pH is preferably reduced to a value in the range 8.5 to 9.

Carbon dioxide is the preferred acid gas because chlorine can be a hazard under certain conditions, the operating costs are lower with carbon dioxide, the capital costs with chlorine gas are likely to be high because chlorine resistant equipment must be used and depletion of the anolyte during the electrolysis using the chlorine system is only partial.

FILTRATION

The first filtration removes colloidal and larger particles which are present in the solution or effluent. Typical filtration methods which can be used are microfiltration, particularly cross-flow microfiltration, said filtration and multimedia filtration.

The preferred method is cross-flow microfiltration. In this method the particular suspension or colloid is passed over the surface of a filtration medium under flow conditions favouring the transport of the suspending liquid through the membrane while the concentrated suspension is force-convected across the membrane surface and out of the filtration device. The filtration medium can be microporous membranes, porous ceramic, plastic or metallic tubes or woven hose.

The second filtration step removes large organic molecules and multivalent ions such as magnesium, calcium, iron, aluminium or any other multivalent ion which forms an insoluble hydroxide or carbonate. The particular technique used is nanofiltration (or charged membrane ultrafiltration) using commercially available nanofiltration membranes such as those sold by the company FilmTec under the trade name FT40. These membranes exhibit a high rejection of multivalent ions and of organic matter having molecular masses above about 300 daltons.

ELECTROCHEMICAL PROCESS

The chloride or carbonate solution which is passed into the anode compartment of the electrochemical cell will have a low concentration of contaminating or unwanted material by virtue of the filtration and other steps already carried out on it. A direct electric current is passed through the cell by applying a potential across the electrodes of the cell. This causes alkali metal ions to pass through the membrane and into the cathode compartment.

In the anode compartment acid gas, i.e. either chlorine or carbon dioxide, will be produced as well as a depleted brine, i.e. a solution containing a low concentration of dissolved bicarbonate or chloride salt and having a pH of the order of 7.5 or less. The regenerated acid gas can be used in the pH reduction step of the process.

Alkali metal hydroxide is produced in the cathode compartment. The concentration of alkali metal hydroxide solution produced in this compartment will typically be 5 to 20% by weight. This alkali metal hydroxide can be returned to the initial contacting step.

The current density used in this step will vary according to the concentration of the salt solution in the anode compartment and the characteristics of the cell. The higher the concentration of the salt solution, the higher the current density which can be used. For a given capacity, the membrane anode and cathode area of the cell are directly proportional to the current density. It is thus preferable to ensure that there is a concentration of at least 10 grams per litre of alkali metal in the salt solution which is introduced into the anode compartment. Ensuring a background level of alkali metal in the salt solution carries with it the advantage that the required membrane area in the electrochemical cell can be reduced.

An embodiment of the invention will now be described with reference to the accompanying flow diagram. Referring to this flow diagram, textile fibre such as cotton is introduced into a scour saturator where the fibre is saturated with a sodium hydroxide solution. From the scour saturator the fibre passes to a scour wash stage. The washed fabric or fibre is removed and a scour effluent is produced. The scour effluent is passed to a neutralisation stage where it is contacted with acid gas in an absorption column. The neutralised effluent is subjected to a cross-flow microfiltration step to remove colloidal and larger suspended particles and thereafter to a nanofiltration step to remove multivalent ions and organic matter having a molecular mass of greater than about 300 daltons. When the acid gas is chlorine, a reducing agent is added to the filtrate upstream of the nanofiltration. The purified effluent is passed into an electrochemical cell where it is electrolysed. The sodium ions pass through the cation selective membrane. Acid gas is produced in the anode compartment while sodium hydroxide is produced in the cathode compartment. The sodium hydroxide is concentrated via a sodium hydroxide re-cycle loop and a portion thereof is taken off for use in the scour saturator. The acid gas produced is delivered to the neutralisation step. Also produced in the anode compartment is a depleted brine which is delivered to the scour wash range step.

It will be appreciated that the process involves a series of closed loops and that the only waste which is discharged is from the two filtration steps. This waste is easily disposable.

The process as illustrated in the flow diagram has been used to treat a cotton scour effluent. A typical composition of the scour effluent is set out in Table I below.

TABLE I

| pH | | 13.5 |
|---|---|---|
| Conductivity | (S/m) | 3.0–9.0 |
| Total carbon | (g/l) | 2.0–4.0 |
| Inorganic carbon | (g/l) | 0.1–0.4 |
| Organic carbon | (g/l) | 1.9–3.6 |
| Chemical oxygen demand | (g/l) | 4.0–50 |
| Sodium | (g/l) | 4.0–1.5 |
| Calcium | (mg/l) | 10–80 |
| Magnesium | (mg/l) | 1.0–20. |
| Carbonate | (g/l) | 1.0–3.0 |
| Hydroxide | (g/l) | 2.0–11 |
| Total solids | (g/l) | 15–50 |
| Temperature | (°C.) | 100. |

The characteristics of the absorption column, filters and cell used in the various steps in the carbonate system are set out in Table II.

TABLE II

| Unit | Comments | Size |
|---|---|---|
| Absorption column | Cylindrical perspex column packed with plastic saddles. | Diameter: 140 mm<br>Height: 1.5 m |
| Cross-flow microfilter | Woven polyester tube arranged in a spiral.<br>Inlet pressure: 250 kPa<br>Pressure drop: 100 kPa | Diameter: 12 mm<br>Total membrane area: 0.45 m$^2$ |

TABLE II-continued

| Unit | Comments | Size |
|---|---|---|
| Nanofilter | Feed velocity: 1.5 m/sec FilmTec FT40 spiral wrap membrane Operating pressure: 1.6 Mpa Operating temperature: below 45° C. | Total membrane area: 0.56 m$^2$ |
| Electro-chemical cell | Steetley DEM D2 cell (PVC frame). | |
| | Anode: precious metal oxide coated titanium | 2 of 0.05 m$^2$ |
| | Cathode: stainless steel | 2 of 0.05 m$^2$ |
| | Membrane: du Pont Nafion 324 Maximum operating temperature: 55° C. Potential: 4 to 12 V per cell Current: up to 300 A (6 000 A/m$^2$) Batch operation from high anolyte concentration (15 g/l Na+) to low anolyte concentration (0 2 g/l Na+). Catholyte concentration: 100 to 200 g/l NaOH | 2 of 0.05 m$^2$ |
| Capacity | 150 l scour effluent/day 3 kg 100% NaOH/day as 100 to 200 g/l solution 135 l depleted brine 75 g (840 l) H$_2$ gas 600 g (420 l) O$_2$ gas | |

The effect of the treatment following the practice of the invention using the carbonate system on the typical scour effluent is set out in Table III below.

TABLE III

| Analysis | Raw scour effluent | After neutralisation | After CFMF | After NF | After electrolysis brine | After electrolysis NaOH |
|---|---|---|---|---|---|---|
| pH | 13.5 | 8.6 | 8.4 | 9.0 | 5.2 | 14.0 |
| Conductivity (S/m) | 6.4 | 2.4 | 2.5 | 2.3 | 0.2 | — |
| Total carbon (g/l) | 4.0 | 7.9 | 7.6 | 5.9 | 0.4 | — |
| inorganic carbon (g/l) | 0.3 | 4.3 | 4.6 | 5.2 | 0.0 | — |
| Organic carbon (g/l) | 3.7 | 3.6 | 3.0 | 0.7 | 0.4 | — |
| Chemical oxygen demand (g/l) | 8.3 | 8.3 | 5.3 | 0.5 | 0.5 | — |
| Hydroxide (g/l) | 4.1 | 0.0 | 0.0 | 0.0 | 0.0 | 70.0 |
| Carbonate (g/l) | 2.6 | 1.9 | 2.0 | 3.4 | 0.0 | 1.5 |
| Bicarbonate (g/l) | 0.0 | 16.1 | 16.5 | 11.5 | 0.0 | 0.0 |
| Sodium (g/l) | 8.4 | 8.2 | 8.8 | 7.2 | 0.3 | 97.0 |
| Calcium (mg/l) | 45.0 | 45.0 | 23.0 | 15.0 | 4.0 | — |
| Magnesium (mg/l) | 7.0 | 5.0 | 6.0 | 3.0 | 1.0 | — |
| Total solids (g/l) | 22.0 | 22.0 | 20.0 | — | 0.5 | — |

In the above table CFMF refers to the cross-flow microfiltration step while NF refers to the nanofiltration step.

It will be noted from the above that neutralisation with carbon dioxide converted the hydroxide effluent to a bicarbonate solution and lowered the effluent pH from 13.5 to 8.6.

On average cross-flow microfiltration removed approximately 27% of the solids, 53% of the calcium and 37% of the magnesium from the neutralised effluent. The chemical oxygen demand was lowered by 61% while there was no significant rejection of sodium bicarbonate.

The nanofiltration produced a colourless permeate or filtrate which contained approximately 10% of the chemical oxygen demand, 90% of the sodium salt and 40% of the calcium and magnesium originally present in the feed to the unit. No fouling of the membrane surface appeared to occur during the process.

The combined pre-treatment sequence lowered the chemical oxygen demand of the scour effluent by 86% and removed 65% of the calcium and organics and 50% of the magnesium. Only approximately 10% of the sodium salt was lost in the concentrates during pretreatment.

Electrolysis of the nanofiltrate produced a colourless depleted brine solution with a minimum total solids concentration of 500 mg/l and a concentrated sodium hydroxide solution. Electrolysis lowered the sodium bicarbonate concentration of the nanofiltrate from 20 g/l to 0,5 g/l. Approximately 95% of sodium present in the feed solution to the electrochemical cell was recovered as sodium hydroxide.

The current efficiency for the recovery of sodium hydroxide from pre-treated scour effluent in the electrochemical membrane cell between 300 and 1,200 A/m$^2$ and temperatures were allowed equilibrate at between 40° and 50° C.

Using the same process as illustrated by the flow diagram, except that chlorine gas was used instead of carbon dioxide, the effect on a typical scour effluent was as set out in Table IV below.

TABLE IV

| | Composition of process stream | | | | |
|---|---|---|---|---|---|
| Analysis | Scour effluent | After neutralisation | After microfiltration | After nanofiltration | After Electrolysis |
| pH | 14.0 | 8.1 | 8.5 | 8.4 | 1.0 |
| Conductivity (mS/cm) | 98.0 | 55.0 | 56.0 | 49.0 | 50.0 |
| Total carbon (g/l) | 11.0 | 8.0 | 7.0 | 7.0 | 4.0 |
| Inorganic carbon (g/l) | 1.0 | 1.0 | 1.0 | 3.0 | 0.0 |
| Organic carbon (g/l) | 10.0 | 7.0 | 6.0 | 4.0 | 4.0 |
| Sodium (g/l) | 17.0 | 17.0 | 16.0 | 17.0 | 9.0 |
| Magnesium (mg/l) | 16.0 | 16.0 | 15.0 | 13.0 | 13.0 |
| Calcium (mg/l) | 78.0 | 70.0 | 20.0 | 12.0 | 16.0 |
| Hydoxide (g/l) | 17.0 | — | — | — | — |
| Carbonate (g/l) | 2.0 | — | — | — | — |
| Chloride (g/l) | 0.5 | 18.0 | 17.0 | 20.0 | 14.0 |
| Chemical oxygen (g/l) | 50.0 | 27.0 | 22.0 | 12.0 | 12.0 |

TABLE IV-continued

| | Composition of process stream | | | | |
|---|---|---|---|---|---|
| Analysis | Scour effluent | After neutralisation | After microfiltration | After nanofiltration | After Electrolysis |
| demand | | | | | |
| Total solids (g/l) | 51.0 | 55.0 | 52.0 | — | — |
| Suspended solids (g/l) | — | 2.0 | 0.0 | 0.0 | 0.0 |

In each of the processes illustrated above, sodium hydroxide was used as the scour solution. The processes have also been carried out using potassium hydroxide as the scour solution with similar results being obtained.

In the illustrated process, if the concentration of salt is too low for electrolysis, concentration thereof may be achieved by introducing a reverse osmosis step between the two filtration steps or after these steps. Similarly, if it is desired to concentrate the depleted brine, that solution can be passed through a reverse osmosis step to produce a more concentrated brine for recycle to the electrochemical cell and to produce high quality water for re-use.

We claim:

1. A method of treating an alkali metal salt or hydroxide solution having a pH of at least 7 which contains multivalent ions, and soluble and insoluble organic and inorganic matter including the steps of:
   (i) if the solution has a pH greater than 9, bringing the pH of the solution to a pH in the range 7 to 9;
   (ii) filtering the solution from step (i) to remove suspended insoluble matter having a size greater than 0,1 microns;
   (iii) filtering the filtrate from step (ii) to remove multivalent ions and organic matter having a molecular mass greater than about 300 daltons;
   (iv) providing an electrochemical cell in which an anode compartment is separated from a cathode compartment by a cation selective membrane;
   (v) passing the filtrate from step (iii) into the anode compartment of the electrochemical cell; and
   (vi) passing an electrical direct current through the cell to cause alkali metal ions to pass through the cation selective membrane and alkali metal hydroxide to be produced in the cathod compartment and an acidic component to be produced in the anode compartment.

2. A method according to claim 1 wherein the solution has a pH of greater than 9 and it is treated with an acid gas to reduce its pH to a value in the range 7 to 9.

3. A method according to claim 2 wherein the acid gas is carbon dioxide.

4. A method according to claim 2 wherein the acid gas is chlorine.

5. A method according to claim 1 wherein the filtration used in step (ii) is cross-flow microfiltration.

6. A method according to claim 1 wherein the filtration method used in step (iii) is nanofiltration.

7. A method according to claim 1 wherein the multivalent ions in the solution include magnesium and calcium ions.

8. A method according to claim 1 wherein the organic matter includes pectins, waxes, sugars and starches.

9. A method according to claim 1 wherein the organic matter includes sugars, starches and lignins.

10. A method according to claim 1 wherein the alkali metal salt is a carbonate or a chloride.

11. A method according to claim 1 wherein the solution is a solution of alkali metal hydroxide.

12. A method according to claim 1 wherein the alkali metal is sodium.

13. A method of treating an organic material with an alkali metal hydroxide solution having a pH of at least 7 including the steps of:
    (i) contacting the organic material with the hydroxide solution to produce an effluent comprising an alkali metal hydroxide solution which contains multivalent ions and soluble and insoluble organic and inorganic matter;
    (ii) reducing the pH of the effluent to a value in the range 7 to 9 by contacting it with an acid gas;
    (iii) filtering the solution from step (ii) to remove suspended insoluble matter having a size greater than 0,1 microns.
    (iv) filtering the filtrate from step (iii) to remove multivalent ions and organic matter having a molecular mass greater than about 300 daltons;
    (v) providing an electrochemical cell in which an anode compartment is separated from a cathode compartment by a cation selective membrane;
    (vi) passing the filtrate from step (iv) into the anode compartment of the electrochemical cell;
    (vii) passing an electrical current through the cell causing alkali metal ions to pass through the cation selective membrane and alkali metal hydroxide to be produced in the cathode compartment and the acid gas to be produced in the anode compartment;
    (viii) returning the alkali metal hydroxide to step (i); and
    (ix) using the acid gas produced in the anode compartment for reducing the pH of the effluent in step (ii).

14. A method according to claim 13 wherein step (i) involves the scouring of an organic fibre to be used in textiles.

15. A method according to claim 13 wherein step (i) involves treatment of fibres useful for producing pulp and paper products.

16. A method according to claim 13 wherein the acid gas is carbon dioxide.

17. A method according to claim 13 wherein the acid gas is chlorine.

18. A method according to claim 13 wherein the filtration used in step (iii) is cross-flow microfiltration.

19. A method according to claim 13 wherein the filtration method used in step (iv) is nanofiltration.

20. A method according to claim 13 wherein the multivalent ions in the effluent include magnesium and calcium ions.

21. A method according to claim 13 wherein the alkali metal hydroxide is sodium hydroxide.

* * * * *